(12) United States Patent
Tagami et al.

(10) Patent No.: US 7,132,776 B2
(45) Date of Patent: Nov. 7, 2006

(54) ELECTRIC MOTOR AND METHOD OF INSULATION BETWEEN COILS OF DIFFERENT PHASES OF ELECTRIC MOTOR

(75) Inventors: Kiyoshi Tagami, Hachioji (JP); Yukio Katsuzawa, Yamanashi (JP); Michi Masuya, Yamanashi (JP); Hideki Oka, Fujiyoshida (JP); Masamoto Fukuda, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 4 days.

(21) Appl. No.: 10/662,306

(22) Filed: Sep. 16, 2003

(65) Prior Publication Data

US 2004/0056558 A1   Mar. 25, 2004

(30) Foreign Application Priority Data

Sep. 20, 2002   (JP) .............................. 2002-275217

(51) Int. Cl.
*H02K 3/15* (2006.01)
(52) U.S. Cl. ..................................... 310/215; 310/194
(58) Field of Classification Search ................ 310/260, 310/214, 215, 194, 254, 258, 259, 270, 206; 29/596–598
See application file for complete search history.

(56) References Cited

U.S. PATENT DOCUMENTS

| | | | | |
|---|---|---|---|---|
| 2,998,540 | A | * | 8/1961 | Phillips ....................... 310/214 |
| 3,909,648 | A | * | 9/1975 | Clark ........................... 310/260 |
| 4,403,162 | A | * | 9/1983 | Pallaro ......................... 310/194 |
| 5,659,219 | A |   | 8/1997 | Momose et al. |
| 6,043,584 | A | * | 3/2000 | DeHart ........................ 310/260 |

FOREIGN PATENT DOCUMENTS

| | | |
|---|---|---|
| JP | 52088701 | 7/1977 |
| JP | 54-132701 | 10/1979 |
| JP | 54132701 | * 10/1979 |
| JP | 61-192646 | 11/1986 |
| JP | 6-29381 | 4/1994 |
| JP | 07-298530 | 11/1995 |

OTHER PUBLICATIONS

Japanese Office Action for corresponding Japanese Application No. 2002-275217 mailed Oct. 19, 2004.
EP Search Report for corresponding application EP 03255878.5-2207 dated Sep. 29, 2005.

* cited by examiner

*Primary Examiner*—Tran Nguyen
*Assistant Examiner*—Leda Pham
(74) *Attorney, Agent, or Firm*—Staas & Halsey LLP

(57) ABSTRACT

An electric motor capable of ensuring insulation of proximal portions of coil edges of a stator projecting from end of a stator core, and a method of insulating the proximal portions of the coil edges of the stator. The insulation sheet has a folding portion for folding one or more coils of the same phase and two insertion portions extending from the folding portion so that distal ends are positioned away from a centerline of the folding portion. One or more coils of the same phase are folded by the folding portion and the two inserting portions are inserted into the slot or slots from which the one or more coils project. The inserting portions are drawn from inside of the stator core so that the folding portion spreads to fold the proximal portions of the coils. The inserting portions are securely held between the wall of the slots and the coils to prevent the insulation sheet from displacement, inclination and slip off to securely insulate the coils of different phases.

4 Claims, 3 Drawing Sheets

FIG. 3
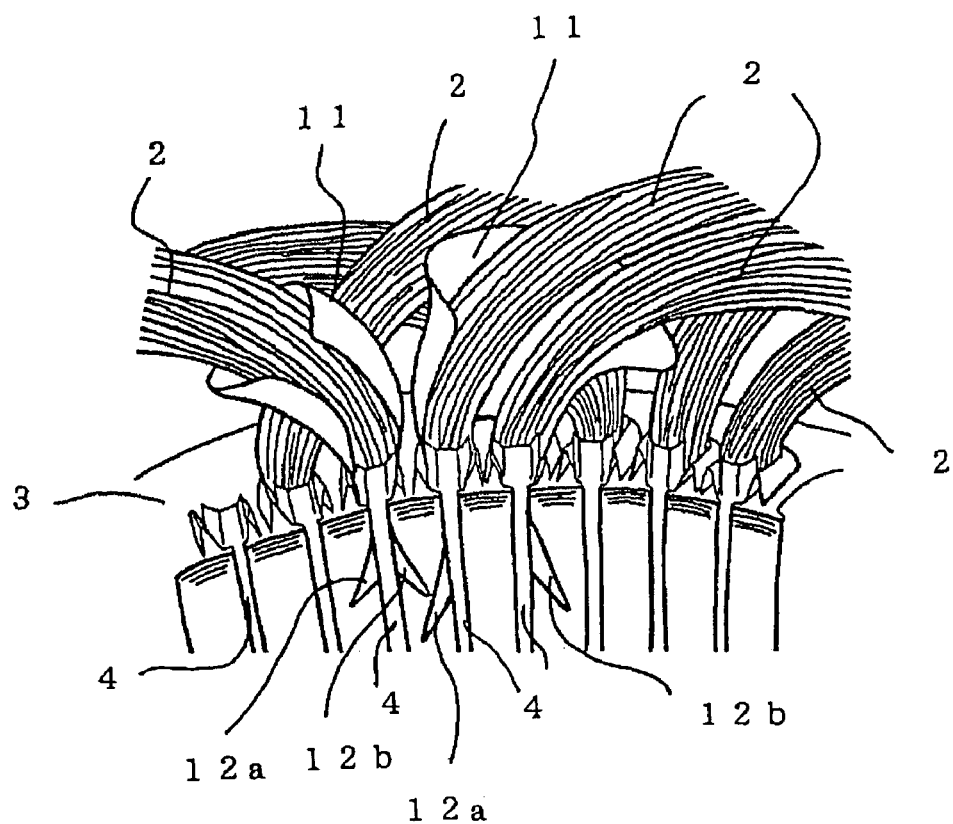
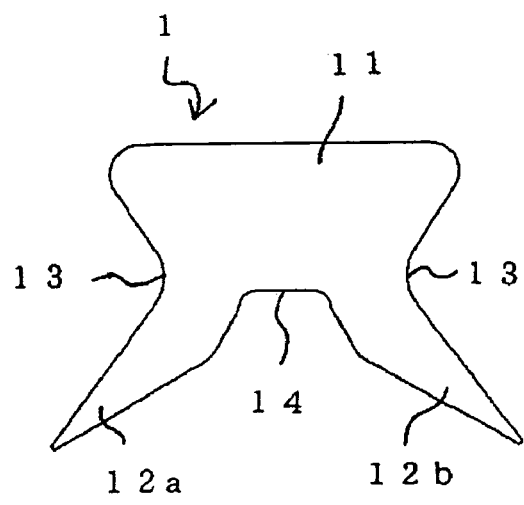
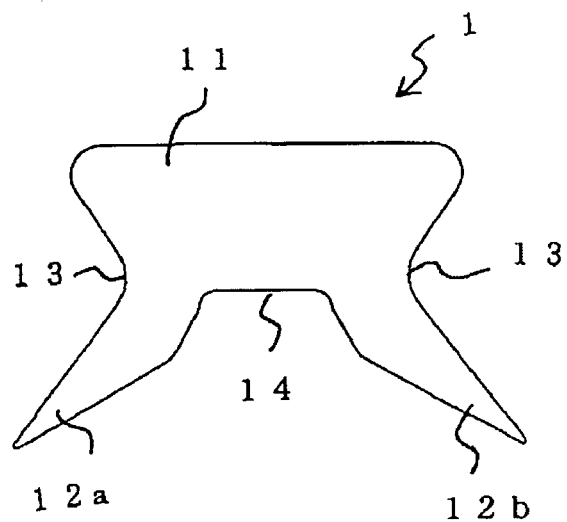

ELECTRIC MOTOR AND METHOD OF INSULATION BETWEEN COILS OF DIFFERENT PHASES OF ELECTRIC MOTOR

BACKGROUND OF THE INVENTION

1. Field of the Invention

The present invention relates to insulation between coils of different phases of a stator of an electric motor and in particular to insulation of the coils at ends of the stator.

2. Description of Related Art

In manufacturing a stator of an electric motor, windings for respective phases are arranged along a plurality of slots formed on a stator core to form coils of respective phase with their edges projecting from respective ends of the slots. At intermediate portions of the coil edges projecting from the ends of the slots, insulation sheets of paper are intervened between coils of different phases for insulation thereof. In order to prevent lowering of the insulation by displacement of the insulation sheets, there have been proposed various improvements regarding shape of the insulation sheet, such as disclosed in JP 7-298530A.

Further, insulation at proximal portions of the coil edges is important as well as the insulation at the intermediate portions of the coil edges. As shown in FIG. 5, for the insulation at the proximal portions of the coil edges, an insulation sheet 20 in the form of a short strap, so-called as an angle sheet, has been used. As shown in FIG. 6, the angle sheet 20 is inserted into a slot 4 of a stator core 3 from which the coil 2 projects so as to insulate the coil 2 projecting from an end of the slot 4 of the stator core 3.

In the insulation of the coil edges of the stator, there are proposed various insulation methods for insulating the intermediate portions of the coil edges of different phases, but there is known only the method of insulation by means of the angle paper 20 with regard to the insulation at the proximal portions of the coil edges.

In the insulation method using the angle sheet 20, the angle sheet 20 in the form of the short strap is liable to displace when an external force is exerted in a direction along a short side of the strap. Thus, in the winding operation of the coils of the stator, after the windings are formed along the slots, the angle sheets 20 are inserted into the slots, and shapes of the coils are adjusted. The angle sheets 20 may displace, deform or slip off by movement of the coils in the adjusting operation to cause lowering of the insulation and necessity of rearrangement of the angle sheets 20. Further, since the angle sheet 20 is inserted into the slot from above, i.e., outside of the coil edges, it is liable that an amount of insertion of the angle sheet 20 is insufficient to make it difficult to securely fix the angle sheet 20 between a wall of the slot and the coil. Thus, the insulation at the proximal portion of the coil edges has been liable to be deteriorated for the above reasons.

SUMMARY OF THE INVENTION

The present invention provides an electric motor capable of ensuring insulation of proximal portions of coil edges of a stator, and a method of insulating the proximal portions of the coil ends of the stator.

According to one aspect of the present invention, the electric motor comprises: a stator core having slots; coils arranged along the slots of the stator core to form coil edges projecting from ends of the stator core; and insulation sheets for insulating proximal portions of the coil edges, each of the insulation sheets having a folding portion for folding one or more coils of the same phase and inserting portions inserted into the slot or slots of the stator core to be fixed by drawing distal ends thereof from inside of the stator core.

According to another aspect of the present invention, the electric motor comprises: a stator core having slots; coils arranged along the slots of the stator core forming coil edges projecting from ends of the stator core; and insulation sheets for insulating proximal portions of the coil edges, each of the insulation sheet having a folding portion for folding one or more coils of the same phase and two inserting portions extending from the folding portion so that respective distal ends are positioned away from a centerline of the folding portion, wherein the coils of the same phase are folded by the folding portions of the insulation sheets, and the inserting portions are inserted into the slots of the stator core by drawing the distal ends thereof from inside of the stator core to thereby insulate the coils of the same phase from coils of different phases.

An interconnecting portion between the folding portion and the insertion portions of the insulation sheet may have a reduced width to form a constricted portion.

The present invention also provides an insulation method for an electric motor including a stator core having slots and coils arranged along the slots of the stator core to form coil edges projecting from ends of said stator core. This method comprises: arranging the insulation sheet as described above between coil edges of different phases; folding the one or more coils of the same phase by the folding portion and inserting the inserting portions into the slot or slots of the stator core; and drawing distal ends of the inserting portions from inside of the stator core to fix the inserting portions so that the coils of the same phase are insulated by the insulation sheet from the coils of different phases. The insulation method may further comprise cutting the distal ends of the inserting portions after the drawing thereof.

BRIEF DESCRIPTION OF THE DRAWINGS

FIG. 3 is an enlarged perspective view of the stator core with the insulation sheets arranged at proximal portions of the coil ends of different phases, as viewed from inside of the stator core;

FIGS. 4a and 4b are diagrams showing different shapes of the insulation sheet;

DETAILED DESCRIPTION

Figure 1:
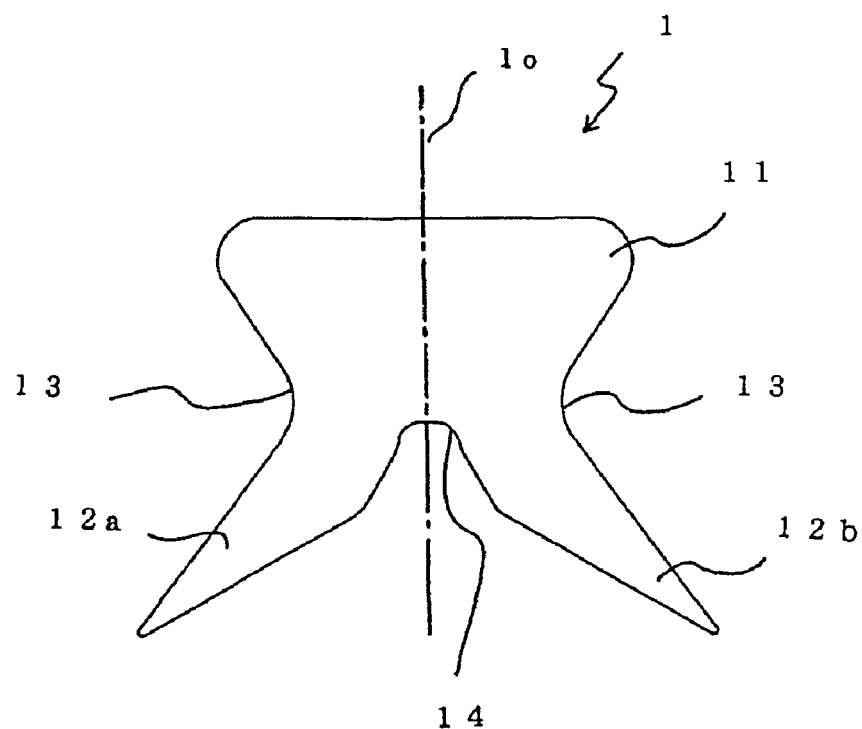
FIG. 1 is a diagram showing a shape of an insulation sheet for insulating coils of respective phases according to an embodiment of the present invention; an example of FIG. 2 is an enlarged perspective view of a stator core with the insulation sheets arranged at proximal portions of coil edges of different phases, as viewed from outside of the stator core.

As shown in FIG. 1, an insulation sheet 1 for insulating proximal portions of coil edges projecting from an end of a stator core is formed to be substantially axisymmetric with respect to a centerline 1o. The insulation sheet 1 has a folding portion 11 for folding coils, and inserting portions 12a and 12b extending from a lower side of the folding portion 11 in the form of short belts so that distal ends thereof are positioned away from the centerline 1*o*. The distal ends of the inserting portions 12*a* and 12*b* are sharpened for easy insertion between inner walls of slits of a stator core and the coils. A width of proximal portions of the inserting portions 12*a* and 12*b* integrally connected with the folding portion 11, is smaller than the other portions and a width of the folding portion 11 is broadened from this interconnecting portion, so that a constricted portion 13 is formed at the interconnecting portion.

Figure 2:
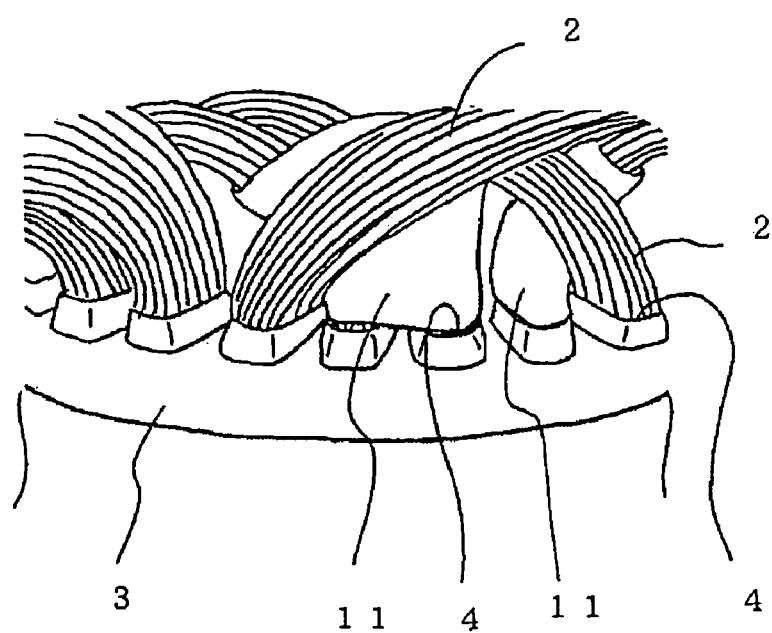
Figure 5:
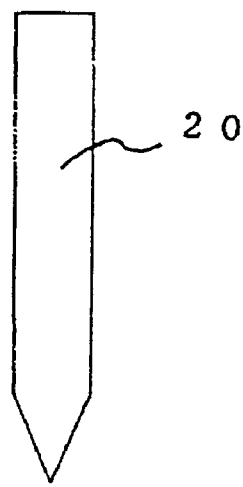
FIG. 5 is a diagram showing a shape of a conventional insulation sheet.
Figure 6:
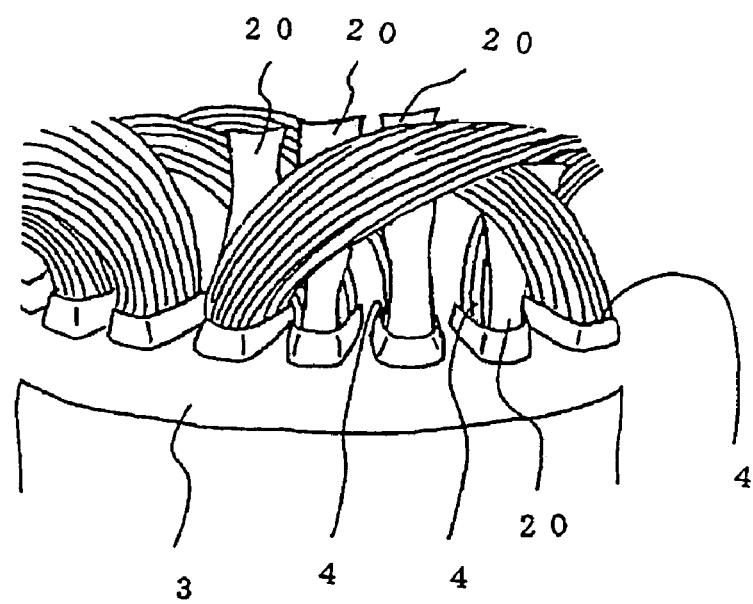
FIG. 6 is an enlarged perspective view of an end of a stator core with the conventional insulation sheets arranged at proximal portions of the coil edges of different phases, as viewed from outside of the stator core.

Using the insulation sheet 1, proximal portions of the coil edge are insulated. Referring to FIGS. 2 and 3, the folding portion 11 of the insulation sheet 1 is brought to be intervened between one or more of the coils 2 of the same phase projecting from the slot 4 of the stator core 3 and the adjacent coils of different phases so that the proximal portions of the coils 2 are folded by the folding portion 11. Then, the inserting portions 12*a* and 12*b* are inserted between the coil 2 and an inner wall of the slot 4 from which the coil is projected or between the coils and inner walls of the slots 4 from which the coils are projected. Then, the distal ends of the inserting portions 12*a* and 12*b* inserted into the slot or slots 4 are held and drawn from inside of the stator core 3.

FIG. 3 shows a state where the inserting portions 12*a* and 12*b* are inserted into the slots 4 and drawn from inside of the stator core 3.

In the drawing operation of the inserting portions 12*a* and 12*b*, if only one of the inserting portions 12*a* and 12*b*, for example, only the inserting portion 12*a* is pulled downwardly from inside of the stator core 3, the insulation sheet 1 inclines in the pulling direction of the inserting portion 12*a*, and if only the inserting portion 12*b* is pulled downwardly from inside of the stator core 3, the insulation sheet 1 inclines in the pulling direction of the insertion portion 12*b*. Thus, the centerline 1*o* of the insulation sheet 1 can be adjusted to be approximately parallel to an axis of the slot 4 by appropriately pulling one of the insertion portions 12*a* and 12*b* so that projecting amounts and inclinations of the insertion portions 12*a* and 12*b* with respect to the slot 4, are made equal.

For folding one coil projecting from one slot 4 by the insulation sheet 1, both of the inserting portions 12*a* and 12*b*, which are inserted into the one slot 4, are simultaneously pulled with even forces by a manufacturer so that the folding portion 11 of the insulation sheet 1 moves into the slot 4 and thus the constricted portion 13 enters into the slot 4 to increase resistance against the pulling forces since the width of the folding portion 11 is gradually increasing from the constricted portion 13. Therefore, on the basis of magnitude of the resistance force in pulling the inserting portions 12*a* and 12*b*, the manufacturer can recognize the amount of drawing of the insulation sheet 1 into the slot 4 to adjust the drawing amounts.

Further, by pulling the inserting portions 12*a* and 12*b* in the form of short belts along the extending direction of the belt, the insulation sheet 1 is pulled to be expanded by the inserting portions 12*a* and 12*b* extending in the direction to be away from the centerline 1*o* of the insulation sheet 1, so that the coil is securely folded by the folding portion 11 to insulate the coil from the coils of different phase.

For folding a plurality of coils of the same phase projecting from a plurality of slots 4 by the insulation sheet 1, both of the distal ends of the inserting portions 12*a* and 12*b*, which are inserted into respective slots 4, are pulled towards inside of the stator, the connecting portion 14 abuts on the end of the stator core 3 between the slots 4 to produce a large resistance against the pulling forces to make the manufacturer recognize that the folding portion 11 of the insulation sheet 1 has folded the coils from the proximal part thereof to complete the insulation of the proximal portion of the coils. The distal ends of the inserting portions 12*a* and 12*b* projecting from an inner circumference of the stator are cut off so that the redundant projecting portions do not interfere with a rotor to be arranged inside the stator.

Thus, the insulation sheet 1 is securely retained by drawing the inserting portions 12*a* and 12*b* into the slots, and also since the insulation sheet 1 holds the coil, large resistance is produced against external forces to incline or displace the insulation sheet 1 so that displacement, inclination and slip off of the insulation sheet 1 are prevented to thus securely insulate the coils of the same phase from the different phases.

In FIGS. 2 and 3, there are shown the insulation of a coil edge extending from one slot by folding the coil edge by the insulation sheet 1 from the coil edges of different phases, and the insulation of coil edges of the same phase extending from two slots by holding the coil edges the insulation sheet 1 from the coil edges of different phases.

As shown in FIG. 3, it is not necessary to cover the entire circumference of the coil or coils by the insulation sheet 1 but it is sufficient that only a part of the circumference of the coil or coils may be covered by the insulation sheet 1.

In the case of folding the coil edges of the same phase extending from a plurality of slots, insulation sheets having enlarged widths as shown in FIGS. 4*a* and 4*b* may be used.

According to the present invention, displacement, inclination and slip off of an insulation sheet are prevented to ensure insulation of proximal portions of coils of a stator.

What is claimed is:

1. An electric motor comprising:
   a stator core having slots;
   coils arranged along the slots of said stator core to form coil edges projecting from ends of said stator core; and
   insulation sheets insulating proximal portions of the coil edges, each of said insulation sheets having a folding portion folding one or more coils of the same phase and inserting portions inserted into the slot or slots of said stator core, said inserting portions having distal ends extending from the slot or slots inside said stator core to be positioned away from a centerline of the folding portion, so that said insulation sheets are fixed by drawing the distal ends from inside of said stator core.

2. An electric motor comprising:
   a stator core having slots;
   coils arranged along the slots of said stator core forming coil edges projecting from ends of said stator core; and
   insulation sheets insulating proximal portions of the coil edges, each of said insulation sheets having a folding portion folding one or more coils of the same phase and two inserting portions extending from the folding portion so that respective distal ends are positioned away from a centerline of the folding portion,
   wherein the coils of the same phase are folded by the folding portions of said insulation sheets, and the inserting portions are inserted into the slots of said stator core, said inserting portions having distal ends extending from the slots inside said stator core, so that said insulation sheets are adapted to be fixed by drawing the distal ends from inside of said stator core to thereby insulate the coils of the same phase from coils of different phases.

3. An electric motor according to claim 1, wherein an interconnecting portion between the folding portion and the insertion portions of said insulation sheet has a reduced width to form a constricted portion.

4. An electric motor comprising:
a stator core having slots;
coils arranged along the slots of said stator core to form coil edges projecting from ends of said stator core; and
insulators insulating proximal portions of the coil edges, each of said insulators folded around one or more coils, said insulators having inserting portions inserted into at least one slot of said stator core, said inserting portions having distal ends extending from the at least one slot inside said stator core, so that said insulators are adapted to be fixed by drawing the distal ends from inside of said stator core.

* * * * *